United States Patent
Guo et al.

(10) Patent No.: US 9,225,606 B2
(45) Date of Patent: Dec. 29, 2015

(54) METHOD FOR CLUSTERING DEVICES IN MACHINE-TO-MACHINE NETWORKS TO MINIMIZE COLLISIONS

(71) Applicant: Mitsubishi Electric Research Laboratories, Inc., Cambridge, MA (US)

(72) Inventors: Jianlin Guo, Newton, MA (US); Philip Orlik, Cambridge, MA (US); Kieran Parsons, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 451 days.

(21) Appl. No.: 13/855,825

(22) Filed: Apr. 3, 2013

(65) Prior Publication Data

US 2014/0304383 A1   Oct. 9, 2014

(51) Int. Cl.
*G06F 15/173* (2006.01)
*H04L 12/24* (2006.01)
*H04W 4/00* (2009.01)
*H04W 84/20* (2009.01)

(52) U.S. Cl.
CPC .............. *H04L 41/12* (2013.01); *H04W 4/005* (2013.01); *H04W 84/20* (2013.01)

(58) Field of Classification Search
CPC ......... H04L 41/12; H04L 41/02; H04L 41/14; H04L 45/02; H04L 45/14; H04L 45/46
USPC .......... 709/208, 209, 223, 226, 238, 240, 248
See application file for complete search history.

(56) References Cited

U.S. PATENT DOCUMENTS

| 6,876,643 | B1  | 4/2005  | Aggarwal |         |
|-----------|-----|---------|----------|---------|
| 6,886,035 | B2* | 4/2005  | Wolff    | 709/219 |
| 7,590,611 | B2  | 9/2009  | Hur      |         |
| 7,890,568 | B2* | 2/2011  | Belenki  | 709/200 |
| 7,961,673 | B2  | 6/2011  | Jain     |         |
| 7,987,228 | B2* | 7/2011  | McKeown et al. | 709/202 |
| 8,040,811 | B2* | 10/2011 | Edwards et al. | 370/241 |
| 8,055,740 | B2  | 11/2011 | Kim      |         |
| 8,102,770 | B2* | 1/2012  | Morrill et al. | 370/235 |
| 8,107,366 | B2* | 1/2012  | Wiley et al. | 370/230 |
| 8,514,789 | B2* | 8/2013  | Akchurin et al. | 370/329 |
| 8,549,405 | B2* | 10/2013 | Bugenhagen et al. | 715/734 |
| 8,619,596 | B2* | 12/2013 | Wiley et al. | 370/248 |
| 2002/0042836 | A1* | 4/2002 | Mallory | 709/232 |
| 2003/0033394 | A1* | 2/2003 | Stine    | 709/222 |
| 2003/0084112 | A1* | 5/2003 | Curray et al. | 709/208 |
| 2006/0146807 | A1* | 7/2006 | Codaccioni et al. | 370/356 |

OTHER PUBLICATIONS

Heinzelman, W., A. P. Chandrakasan, H. Balakrishnan, "An Application-Specific Protocol Architecture for Wireless Microsensor," IEEE Transactions on Wireless Networking, pp. 660-670, Oct. 2002.

* cited by examiner

*Primary Examiner* — Phuoc Nguyen
*Assistant Examiner* — Davoud Zand
(74) *Attorney, Agent, or Firm* — Dirk Brinkman; Gene Vinokur

(57) ABSTRACT

Nodes in a network are clustered by first determining, in each node, a cluster head capability (CHC). The CHC is broadcasting, directly or indirectly, until all nodes have received the CHCs. Each node nominates, one or more candidate cluster heads based on the CHCs, and then, in each node, at least one cluster head is selected from the candidate cluster head nodes based on maximal CHCs.

17 Claims, 9 Drawing Sheets

| Type | RS_CH_ID | SEQ | RL | Options |

| Type | ACK_CH_ID | RS_CH_ID | SEQ | Options |

| Type | RS_CH_ID | SEQ | Options |

METHOD FOR CLUSTERING DEVICES IN MACHINE-TO-MACHINE NETWORKS TO MINIMIZE COLLISIONS

FIELD OF THE INVENTION

This invention relates generally to communication networks, and particularly to clustering communication devices (nodes) wireless machine-to-machine networks to minimize for collisions.

BACKGROUND OF THE INVENTION

In a machine-to-machine (M2M) network, devices such as sensors and smart meters measure data, such as temperatures, energy consumptions, machine operations, vehicle telematics, etc. Measured data are communicated through the network (wireless, wired or hybrid) to applications that process the data. Standards Development Organizations (SDOs), such as the Association of Radio Industries and Businesses (ARIB), the Telecommunication Technology Committee (TTC) of Japan, the Alliance for Telecommunications Industry Solutions (ATIS), the Telecommunications Industry Association (TIA) of the USA, the China Communications Standards Association (CCSA), the European Telecommunications Standards Institute (ETSI), the Telecommunications Technology Association (TTA) of Korea, and the Global Standards Collaboration (GSC) seek to develop end-to-end specifications for M2M communications using common use cases and architecture principles across multiple M2M applications.

The wireless M2M network is similar as conventional sensor network or ad hoc network in the sense of network topology and multi-hop communication. Devices in a wireless M2M network can form mesh networks, a star networks, or both. Data measured by the devices can be relayed multiple hops to a gateway or data concentrator.

However, the M2M network is different from conventional networks in that devices in a M2M network are typically heterogeneous. Some devices such as personal computers have sufficient resources, such as memory, processing power, power supply, etc. On the other hand, small devices such as temperature sensors have very limited resources. These resource constrained devices are not capable of communicating large volumes of data, such as audio-visual data. In conventional sensor network or ad hoc network, all devices tend to be homogeneous with the same capability and resources. Typically, sensor devices only transmit limited amounts of data, which allows peer devices to queue and forward data towards the gateway or data concentrator. Therefore, clustering devices in a M2M network is different from clustering devices in conventional sensor network.

There are existing cluster methods for conventional sensor networks and ad hoc networks. For example, an application-specific architecture for wireless micro-sensor networks, called low-energy adaptive clustering hierarchy (LEACH), selects a cluster head in a deterministic way. LEACH protocol shares the cluster head role among all devices in the network. In each transmission round, a fixed percentage of the devices are selected as cluster heads. Within a cluster, cluster members communicate their data to the cluster head using time-division multiple access (TDMA), which allows the devices to be in standby mode when not transmitting data. However, LEACH is not suitable for M2M networks that use heterogeneous M2M devices, particularly resource constrained devices.

U.S. Pat. No. 8,055,740 describes a method for managing clusters in a wireless sensor network. A cluster head collects sensing data from sensor nodes and aggregates the sensing data. The cluster head of master cluster transmits aggregated data to a sink node, and a cluster head of slave cluster transmits aggregated data to the master cluster. If the cluster size of the master cluster is less than a threshold, then the cluster head of this master cluster merges this cluster into another master cluster as a slave cluster. If the cluster size of the master cluster is greater than a threshold, then cluster head of the slave cluster splits its cluster from the master cluster. This method includes heavy overhead by transmitting periodic discovery packets to determine link stability values, cluster size requests, and response packets. It does not consider collision reduction.

U.S. Pat. No. 7,961,673 describes a method for clustering devices in a wireless network. That network includes an access point and multiple computing units grouped into a cluster as a function of a predetermined parameter. The cluster includes a cluster head and at least one cluster member. The cluster member uses a first power level when communicating with the cluster head, and the cluster head unit uses a second power level when communicating with the access point. That method assumes location information is available. In a M2M network, obtaining locations for all devices is not feasible. Another limitation of that method assumes the devices are capable of multi-power level transmission.

U.S. Pat. No. 7,590,611 describes a clustering method for a wireless sensor network that minimizes energy consumption. That method determines a number of initial nodes within transmission range of an ordinary node, which is within a transmission range of a cluster head, and setting an ordinary node having a highest number of initial nodes, as a gateway. A cluster head collect and aggregate data, and a gateway routes aggregated to a data sink. The method tries to minimize the number of cluster heads and gateways because they consume more energy than ordinary nodes. One disadvantage of that method is communication overhead, instead of transmitting data to the gateway and then to a next cluster, the cluster head directly transmits data to next cluster.

U.S. Pat. No. 6,876,643 provides a method for clustering in an ad hoc wireless network. That method organizes a set of nodes into a minimum number of connected clusters of bounded size, defines a master-designate and a slave-designate. The master-designate collects data and the slave-designate is selected as proxy slave to route data. One disadvantage of that method is communication overhead. Instead of transmitting data to the proxy slave and the proxy slave forwarding data to next cluster, the master-designate can directly transmit data to next cluster.

Clustering of devices can also be used for collision minimization and other purposes. Collision causes packet loss. Lost packet needs to be retransmitted. Therefore, packet loss decreases reliability and increases delay. Retransmission increases bandwidth usage and communication overhead, which in turn increases energy consumption, which shortens the life time of battery-powered devices.

To minimize transmission collision in M2M networks, different clustering methods are required. Therefore, it is desirable to provide a clustering method for large scale M2M networks that minimize collisions. Minimizing collisions can improve packet delivery reliability, reduce transmission delay, and increase network throughput.

SUMMARY OF THE INVENTION

The embodiments of the invention provide a method clustering nodes to minimize collisions among nodes in machineto-machine (M2M) networks. The method groups nodes in the M2M network into clusters in a distributed manner, without any pre-defined threshold and global parameters.

Nodes are classified into different classes based on their capabilities, such that a higher class node has a higher probability to be selected as a cluster head than a lower class node.

Each node determines a cluster head capability (CHC) and broadcast the CHC. A node nominates one or more its neighboring nodes as a cluster head candidate based on the CHC, and the a cluster head candidate can accept or reject the nomination by comparing its CHC with the CHCs of neighboring cluster head candidates within, e.g., half of a transmission range. A non-cluster head node can join a primary cluster and multiple secondary clusters. Transmission collision within a cluster is minimized by forming each cluster as a clique. In the clique, all nodes are detectable.

Transmission collision between neighboring clusters is avoided by coordination among the neighboring clusters. The cluster head makes time slot reservation for collecting data in its cluster. Neighboring cluster heads acknowledge the reservation, and collect data at other times. Non-neighboring clusters can collect data concurrently because nodes in non-neighboring clusters outside the transmission range so that collisions cannot occur.

Data collection in a cluster is managed by the cluster head such that any channel access scheme can be used. The cluster heads forwards data to a destination by using a routing method.

BRIEF DESCRIPTION OF THE DRAWINGS

FIG. 7A shows format of data collection reservation (DCR) packet according to embodiments of the invention;

FIG. 7B shows formation of reservation acknowledgement (RA) packet according to embodiments of the invention;

FIG. 7C is a block diagram of formation of reservation relinquish (RR) packet according to embodiments of the invention;

DETAILED DESCRIPTION OF THE PREFERRED EMBODIMENTS

Figure 1:
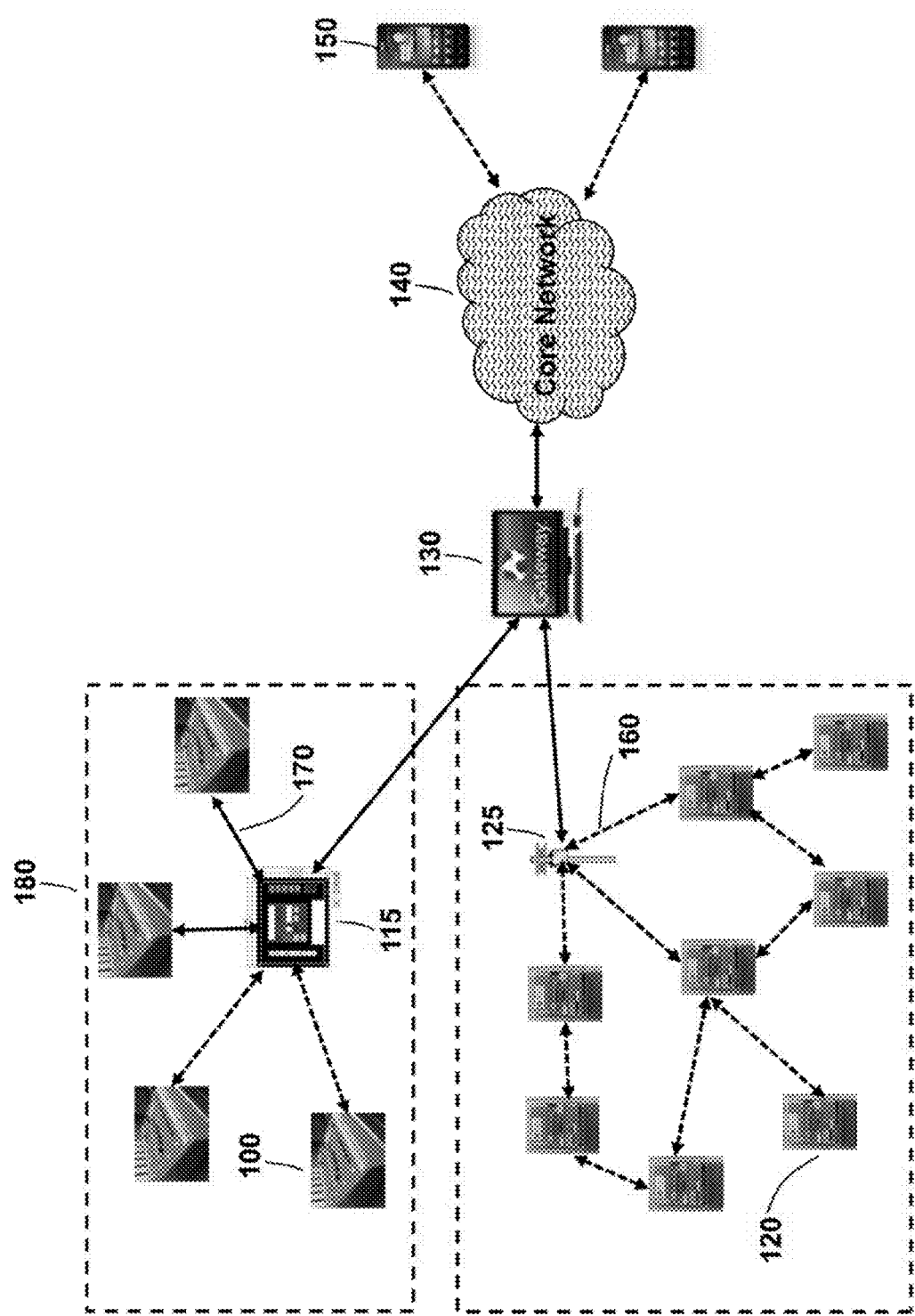
FIG. 1 is a schematic of machine-to-machine (M2M) network in which some embodiments of the invention can operate.

FIG. 1 shows an example of M2M network with heterogeneous nodes according to embodiments of our invention. Transceivers (nodes) 100 associated with devices communicate with a controller 115. Nodes 120 associated with, sensors, e.g., smart meters 120, send data to a concentrator 125. The controller 115 and concentrator 125 communicate collected data to a gateway 130, which communicates with a core network 140, which in turn, communicates data with applications 150. Nodes can communicate via a wireless link 160 or a wired link 170, or both. The M2M network can be organized into different topologies, e.g., a star network 180, or a mesh network 190 with relay and router nodes as needed.

The focus of our invention is on the nodes (transceivers). The type of devices, machines, sensors, etc. that are associated with nodes is less important. However, in most cases, the capabilities and characteristics of the nodes depends on the type of devices that are associated with the nodes. In addition, the nodes are typically co-located or integral components of the devices. Hence, the term device and node are used interchangeably herein. But with respect to communication task it is the nodes (transceivers) that are of major concern. It is also understood that some nodes, such as relays only include a transceiver.

The M2M network can include hundreds, if not thousands, of nodes of different types, different capabilities, and different resources. In other words the network is heterogeneous. For example, in a factory, there are machines, personal computers, monitoring sensors, gateways, etc. The applications that use measured data can be remote from the nodes, so relays may be needed.

Some small devices, such as temperature sensors, are incapable of relaying data for other devices, or can only relay data after a long delay. Low reliably is also an issue. Some devices, such as the gateway, can relay data without delay and high reliability. Therefore, it is desirable to organize the nodes in the M2M network into clusters, and to select one capable node in the cluster as a cluster head (CH). A capable node is defined as any node that is suitable for collecting data from other nodes and routing collected data to destinations.

In the M2M network with clusters, transmission collision can occur in two ways: collision with nodes in neighboring clusters and collision among nodes within the cluster. A neighboring node is defined as any node within a specified transmission range. With carrier sense multiple access (CSMA) scheme, collisions are possible in both cases. Although time-division multiple access (TDMA) scheme can avoid collisions within the cluster, without coordination, TDMA does not solve collision with nodes in neighboring clusters.

Within the cluster, TDMA scheme is collision free and more energy efficient for battery powered nodes. TDMA is suitable for collecting data from a cluster of nodes with predictable amount of data transmission. If a cluster includes different types of nodes, and data requirements vary over time, then CSMA is a more practical approach because it is difficult for the cluster head to make time reservations for such of nodes. In addition, in a distributed cluster, the node that is the cluster head can change over time, which makes TDMA time reservation difficult. Therefore, CSMA is also needed for data collection in the M2M networks. With CSMA, only nodes that have data to transmit contend for channel access, and the cluster head does not need to make time assignments for nodes. However, transmission collision is still an issue for CSMA.

Therefore, our clustering method for M2M networks minimizes the probability of collisions within a cluster and among neighboring clusters.

Neighbor Discovery with Distance Determination

Each node in our M2M network maintains a set (NB) that includes neighboring nodes of the node. Initially, a node i sets the set NB(i) to be empty. An entry in the set NB(i) has a format (ID, D, CHC), where ID represents an identifier of a neighboring node, D represents a distance from node i to the neighboring node and CHC represents the cluster head capability of the neighbor node. CHC determination is described below. Initially, the CHC is 0.

At network start up, each M2M node transmits a discovery packet. When a node i receives the discovery packet from a neighbor j, the node i determines a distance D as follows:

$$D(i, j) = POW\left(\frac{P_0 - P_r}{10\alpha}\right) \quad (1)$$

where $P_0$ is the receiver power at 1 meter from the node j, $P_r$ is the receiving power at node i, and $\alpha$ is a path loss exponent of the channel between nodes i and j. After the distance D(i, j) is determined, node i adds an entry (j, D(i, j), CHC(j)) into the NB(i) with CHC(j)=0. After neighbor discovery, no node has an empty neighbor set. In other words, there are no hidden nodes in our M2M network.

Device Classification and Cluster Head Capability Assessment

In a conventional homogeneous network, such as a sensor network, all devices have similar capabilities and functions. Devices measure similar amount of data. Devices that are close to a data sink can send data directly to the data sink. However, data measured by some devices need to be relayed multiple hops towards to the data sink. Also some devices relay more data than other devices. Devices that relay more data consume more energy. Therefore, conventional cluster methods mainly focus on energy saving to prolong network lifetime for battery powered devices.

However, in the heterogeneous M2M network, some devices such as AV devices transmit much more data than other devices such as building monitoring sensors. Some devices have more resources than other devices. For example, a device, such as the gateway or the concentrator, can have a fast processor and a large memory, while a device such as temperature sensor or smart meters, has a slow (8-bit) processor and a small (kilobyte sized) of memory. Therefore, some M2M devices are capable of being cluster head, while others are not.

The M2M network can include gateways, smart meter data concentrators, smart meters, factory machine controllers, machines, battery powered building monitoring sensors, and battery powered room temperature sensors, etc. Based on capability, devices in our M2M network can be classified into different classes. Nodes that are more capable of being a cluster head have a higher classification than nodes that are less capable. For example, the capability classifications are in an integer range from 6 to 0, wherein a node with a capability classification of 0 cannot be a cluster head under any circumstances.

Class 5: The gateway can transfer data among networks and is mains-powered (connected to an electric power grid)

Class 4: Smart meter data concentrator and factory machine controller because they are designed to collect data from smart meters or machines and are also mains-powered.

Class 3: Factory machines because they typically have wired connection to machine controller and are mains-powered.

Class 2: Smart meters typically uses wireless link for data transmission, and are mains-powered.

Class 1: Large scale sensors, e.g., building sensors and the like, are class 1 devices because they are battery-powered and have limited resources.

Class 0: Small scale sensors, e.g., room temperature sensors, are class 0 devices because they are battery-powered and cannot relay data, in other words, they are not capable of being the cluster head.

Class 5 and class 4 devices can be cluster heads because they have enough processing power and resources, and are mains-powered. Class 3 devices can be cluster head candidates due to their reasonable resources and wired communication connection. Class 2 devices are mains-powered and have sufficient energy, however, they have limited resources and use wireless communication link, they are capable of relay certain amount of data. Class 1 devices can only relay limited amount of data. Class 0 devices are not capable of being a cluster head under any circumstances.

Device classification depends on the device type, device capability, device resource, device functionality, device power source, and M2M network characteristics. Therefore, there are different ways to classify M2M devices.

For clustering purpose, the M2M node performs and broadcast the CHC. Following is an example CHC for node i:

$$CHC(i) = \frac{C(i)}{C_{max}} E(i)ER(i), \quad (2)$$

where CHC can be a fractional number, C(i) is a capability classification of node i, $C_{max}$ is a maximal classification, E(i) is a percentage of remaining energy of node i, and ER(i) is an expected reliability of node i when the node is a cluster head and routes data.

In above classification example, C(i) is 2 for a smart meter and $C_{max}$ is 5. For mains-powered device, E(i) is always 1, and for battery-powered device, E(i) is initially 1, and updated according to actual measurement. ER(i) is initially set to 1 and updated according to $T_s/T_t$, where $T_s$ is the number of successful transmissions while routing data and $T_t$ is the number of total transmissions while routing data.

For two nodes i and j, if CHC(i)>CHC(j), then node i is more suitable to be nominated as a cluster head than node j.

Cluster Formation Packets

FIGS. 2A, 2B, 2C, 2D, and 2E show the packets for clustering.

Figure 2:
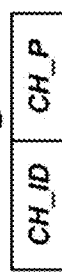
FIG. 2A is a block diagram of structure of cluster formation (CF) packet according to embodiments of the invention.
FIG. 2B is a block diagram of structure of cluster head nomination (CHN) packet according to embodiments of the invention.
FIG. 2C is a block diagram of structure of cluster head acceptance (CHA) packet according to embodiments of the invention.
FIG. 2D is a block diagram of structure of cluster member registration (CMR) packet according to embodiments of the invention.
FIG. 2E is a block diagram of structure of cluster member announcement (CMA) packet according to embodiments of the invention.

FIG. 2A shows the format of a cluster formation (CF) packet 200. The CF packet includes a Type field, an ID field, a sequence (SQ), a CHC field, and an Options field for additional options.

FIG. 2B shows the format of a cluster head nomination (CHN) packet 210. The CHN packet includes the Type field, the ID field, an ID_CH field to identify a node nominated as cluster head, the CHC field, and the Options field.

FIG. 2C shows the format of a cluster head acceptance (CHA) packet 220. The CHA packet includes Type, ID, CS, MS, ATT, MTT, TN, MN and Options fields. The CS field denotes the cluster size when the node acted as the cluster head, The CS field is initially set to 0. The MS represents the maximal cluster size supported by the node. ATT represents an average transmission time when the node is a cluster head and routes collected data. The ATT is initially set to 0. The MTT is the maximal transmission time when the node acts as the cluster head and routes collected data, initially set to 1. The TN is total number of bytes relayed by the node, also initially set to 0. The MN is the maximal number of bytes that can be relayed by the node.

FIG. 2D shows the format of a cluster member registration (CMR) packet 230, which includes the Type, ID, (CH) fields, and a cluster head priority (CH_P). If CH_P=0, the corresponding cluster head is a primary cluster, if CH_P=1, the corresponding cluster head is the first secondary cluster head, if CH_P=2, the corresponding cluster head is the second secondary cluster head, and so on. The number n represents number of cluster head selected by a node.

FIG. 2E shows the format of a cluster member announcement (CMA) packet 240, which includes the Type field, CH_ID, CM_ID, and Options fields for cluster sizes CS.

Cluster Formation

Cluster formation can be performed periodically or on-demand. A cluster manager controls when to perform clustering. Any mains-powered node can be selected as the cluster manager. However, higher class nodes are preferred as cluster manager due to their capabilities and resources. Each node i maintains the cluster sequence number SQ(i), which is initially set to 0. The cluster manager uses the sequence number to initiate clustering. During cluster formation, the cluster manager broadcasts the cluster formation (CF) packet 200 with an incremented cluster sequence number. Whenever a node receives the CF packet with a larger sequence number than any CF packet received previously, the node participates in clustering. The gateway can be the cluster manager, for example.

Figure 3:
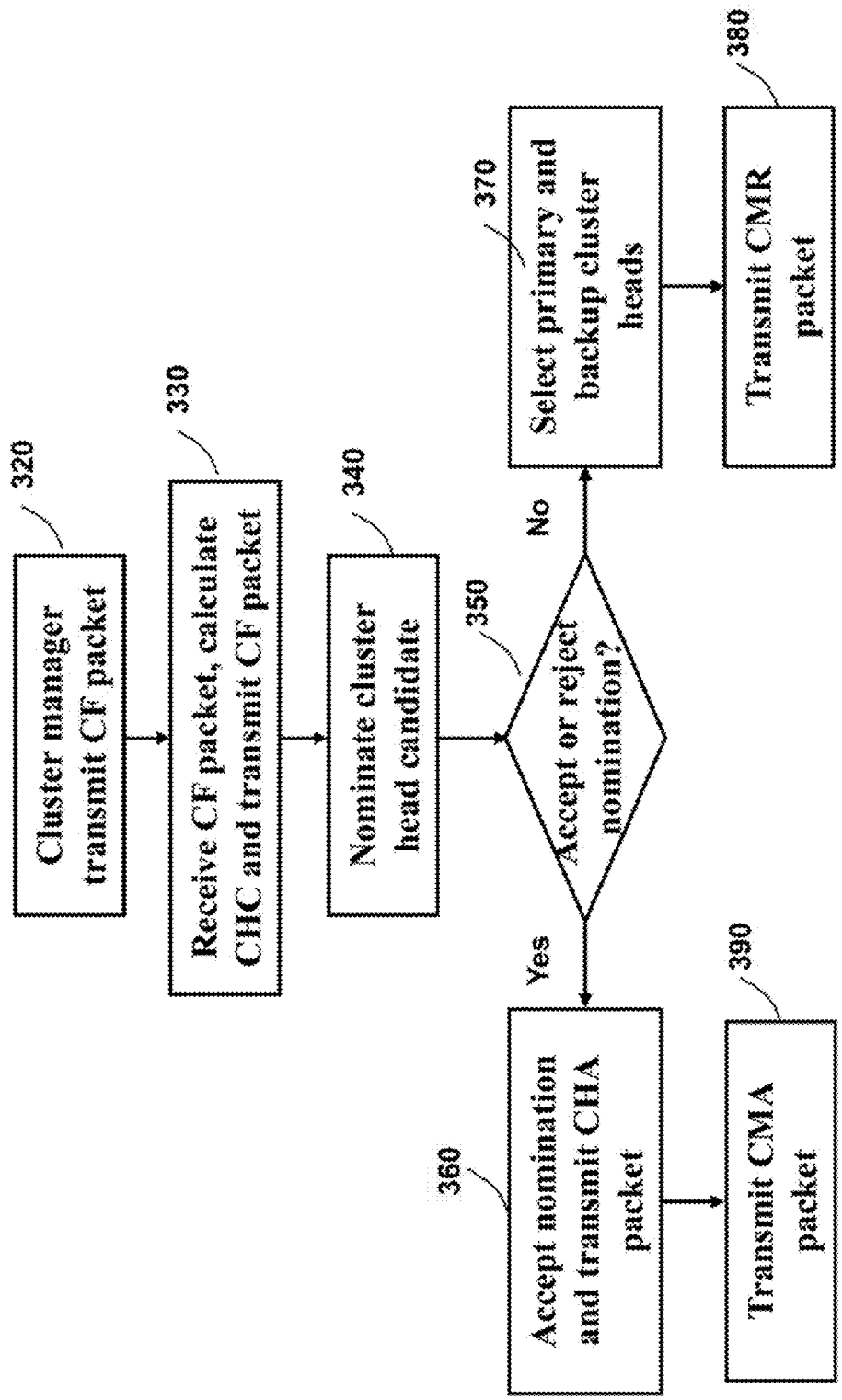
FIG. 3 is a block diagram of cluster formation according to embodiments of the invention.

As shown in FIG. 3, clustering is distributed without any pre-defined threshold or global parameter. To start clustering, the cluster manager, e.g., the gateway g, increments the cluster sequence number SQ(g), and broadcasts 320 the CF packet. The cluster manager has a highest capability classification C(g), both ER(g) and E(g) are set to 1. Therefore, CHC(g) is 1.0 in this case, which is the maximal CHC. All the first hop neighboring nodes of the node g receive the CF packet.

After receiving 330 the CF packet containing the SQ field with a greater value, the first hop node updates the corresponding entry in the set NB with the received CHC, perform its own CHC determination, set its SQ to the SQ contained in the received CF packet, and rebroadcast the CF packet. For example, if node i receives the CF packet from gateway g, it determines CHC(i), sets SQ(i) to 1.0 and broadcast the CF packet containing (i, SQ(i), CHC(i)). After receiving the CF packet containing an equal value in the SQ field, a node updates corresponding entries in the set NB with the CHC in the CF packet.

After a node receives the CF packets from all neighboring nodes, the node nominates 340 a neighbor node with the maximal CHC as a cluster head candidate and transmit the cluster head nomination (CHN) 210 packet. The cluster manager, e.g., the gateway g, nominates itself as cluster head candidate because it has the maximal CHC.

After receiving the CF packets transmitted by the first hop nodes, the second hop nodes of gateway g perform the same cluster head capability assessment, and the cluster head nomination process as the first nodes do. This cluster head nomination continues until all nodes in M2M network make nominations.

Each node monitors the cluster head nomination process and store cluster head candidate information, except nodes that are incapable of being a cluster head. Nodes that have been nominated as cluster head candidates either accept or reject the nomination 350. A cluster head candidate node compares its CHC with the CHCs of neighboring cluster head candidates that are within half of the transmission range (R). If the cluster head candidate has the maximal CHC, it accepts the nomination. Otherwise, it rejects the nomination. If a cluster head candidate accepts nomination, it broadcasts 360 the cluster head acceptance (CHA) packet 220.

Based on a cluster head acceptance rule, the distance between any two cluster heads must be greater than R/2. This limits the number of nodes selected as cluster heads.

Nodes that are not cluster heads select 370 one primary cluster head and one or more secondary cluster heads based on a cluster head selection (CHS) criterion. Cluster heads are selected in a distributed fashion. There is no common threshold necessary. A node selects the cluster heads based local requirements. There can be different criteria.

For example for each neighboring cluster head h, a non-cluster head node i determines the CHS for h as follows:

$$CHS(i, h) = CHC(h) * \left(1 - \frac{2*D(i, h)}{R}\right) * \left(1 - \frac{CS(h)}{MS(h)}\right) * \left(1 - \frac{ATT(h)}{MTT(h)}\right) * \left(1 - \frac{TN(h)}{MN(h)}\right) \quad (3)$$

where CHC(h) is given by equation (2), D(i, h) is distance between node i to node h, R is the transmission range, and the other parameters are obtained from CHA packet transmitted by node h. All nodes in the M2M network are assumed to have similar transmission ranges R.

If CHS(i, h) is less than zero, the distance between cluster head h and node i is greater than R/2, and therefore, node i does not select node h as its cluster head. Node i selects a primary cluster head h with the maximal CHS(i, h) and selects secondary cluster heads with subsequent CHS(i, h)s. After selecting primary and secondary cluster heads, the node i broadcasts 380 a cluster member registration (CMR) packet 230.

The cluster head monitors the CMR packets transmitted by nodes in its neighbor set, and adds the primary cluster heads contained in the CMR packets into a set of neighboring cluster heads.

Based on equation (3), a node does not select a cluster head that is more than the distance R/2 from node. This guarantees any two cluster members within same cluster have a distance less than the transmission range R. This minimizes the hidden node problem.

After receiving or overhearing the CMR packet from all its non-cluster neighboring nodes, the cluster head h broadcast 390 the cluster member announcement (CMA) packet 240, which contains identifiers of non-cluster nodes in its cluster.

If there is no cluster head within the distance R/2 of a node, then this node has no cluster head selected. This node sends an orphan request to the node that it has nominated as cluster head candidate. After receiving the orphan request, the non-cluster head node performs the cluster head role for the orphan node to collect data and relay data.

Figure 4:
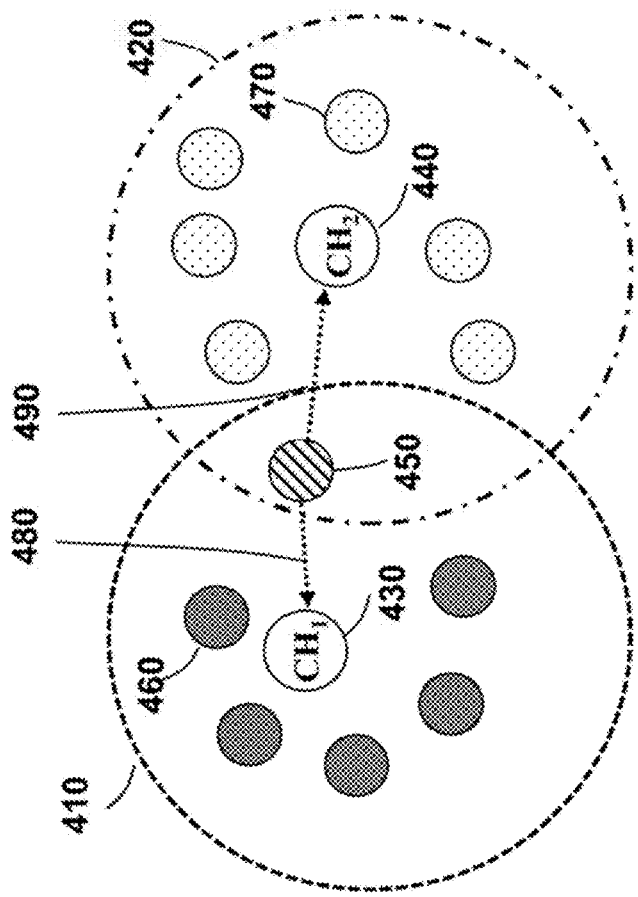
FIG. 4 is a schematic of an example of primary and secondary cluster head selections according to embodiments of the invention.

FIG. 4 shows an example network with two clusters $C_1$ 410 and $C_2$ 420, and cluster head ($CH_1$ 430 and $CH_2$ 440. A node i 450 selects cluster $C_1$ as its primary cluster and cluster $C_2$ as its secondary cluster. In addition to node i, cluster $C_1$ also includes other nodes 460. Similarly, in addition to node i, cluster $C_2$ also has other nodes 470. Node i can communicate with cluster head $CH_1$ via link 480 and with cluster head $CH_2$ via link 490.

Hidden Node Elimination

In wireless communication, a node is hidden when its packets cannot be received by any another node. Node A is said to be hidden from node B if node B cannot receive from node A, but node C can receive both node A and node B. Hidden nodes can cause transmission collision and retransmission. Carrier sense multiple access with collision avoidance (CSMA/CA) scheme does not solve the hidden node problem.

To eliminate hidden nodes within a cluster, set of nodes in a cluster form a clique, such that packets transmitted by any node can be received by the rest of nodes within the cluster. It can be shown that for the cluster head h, its cluster set C(h) is a clique if and only if $$\forall d \in C(h), C(h) \subset (NB(d) \cup \{d\}) \quad (4)$$

where NB(d) is the neighboring set of node d.

With the clustering according to the embodiments, the distance between any pair of nodes in the cluster is less than or equal to transmission range R. Therefore, from a distance point of view, the nodes are within transmission range of each other.

Figure 5:
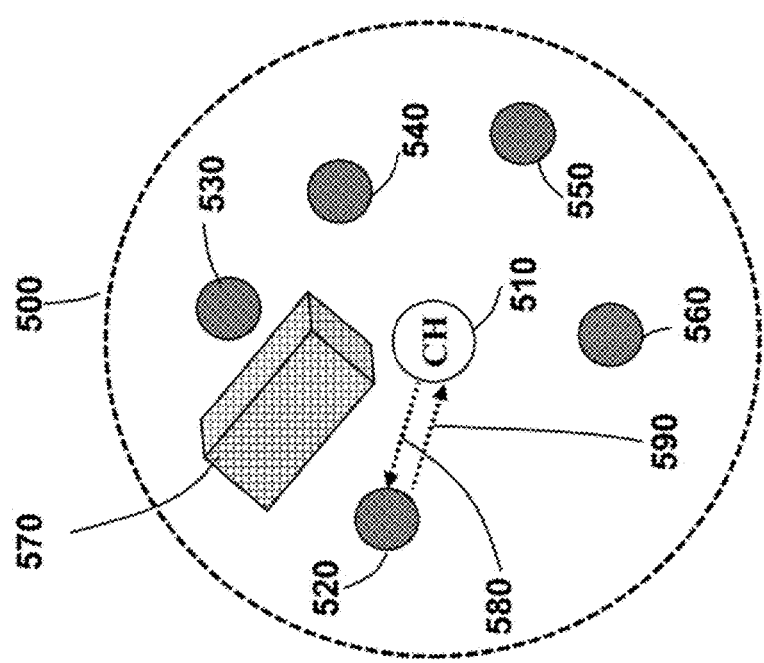
FIG. 5 is a schematic of an example of eliminating hidden nodes within a cluster according to embodiments of the invention.

However as shown in FIG. 5, the hidden node problem can still be possible. For example, a radio opaque object 570 can block communication between two nodes. To ensure there are no hidden nodes, after receiving the CMA packet from its primary cluster head and secondary cluster heads, the cluster member node i checks whether all cluster members belong to its set NB(i). If not, at least one node is hidden from node i. If there is a hidden node in its primary cluster, node i can then switch to a secondary cluster without hidden nodes.

In FIG. 5, a cluster 500 includes a cluster head 510, cluster members 520, 530, 540, 550, and 560. However, there is a radio opaque object 570 between cluster members 520 and 530. Therefore, cluster member 520 cannot receive from cluster member 530. As a result, cluster member 530 is not in the neighbor set of cluster member 520. After receiving the CMA packet 580 from cluster head 510, cluster member 520 changes cluster 500 as its secondary cluster by re-transmitting 590 the CMR packet.

Coordination Among Neighboring Clusters for Data Transmission

Two clusters are neighboring clusters when any transmission in one cluster interferes transmission in the other cluster. For two clusters, if the distance between two cluster heads is greater than ~3R/2, these two clusters do not interfere with each other and they can communicate data concurrently during the same time slot. However, if the distance between two cluster heads is less than or equal to ~3R/2, there is a probability of interference between the two clusters. With the elimination of hidden node in a cluster, collision within same cluster is minimized.

Figure 6:
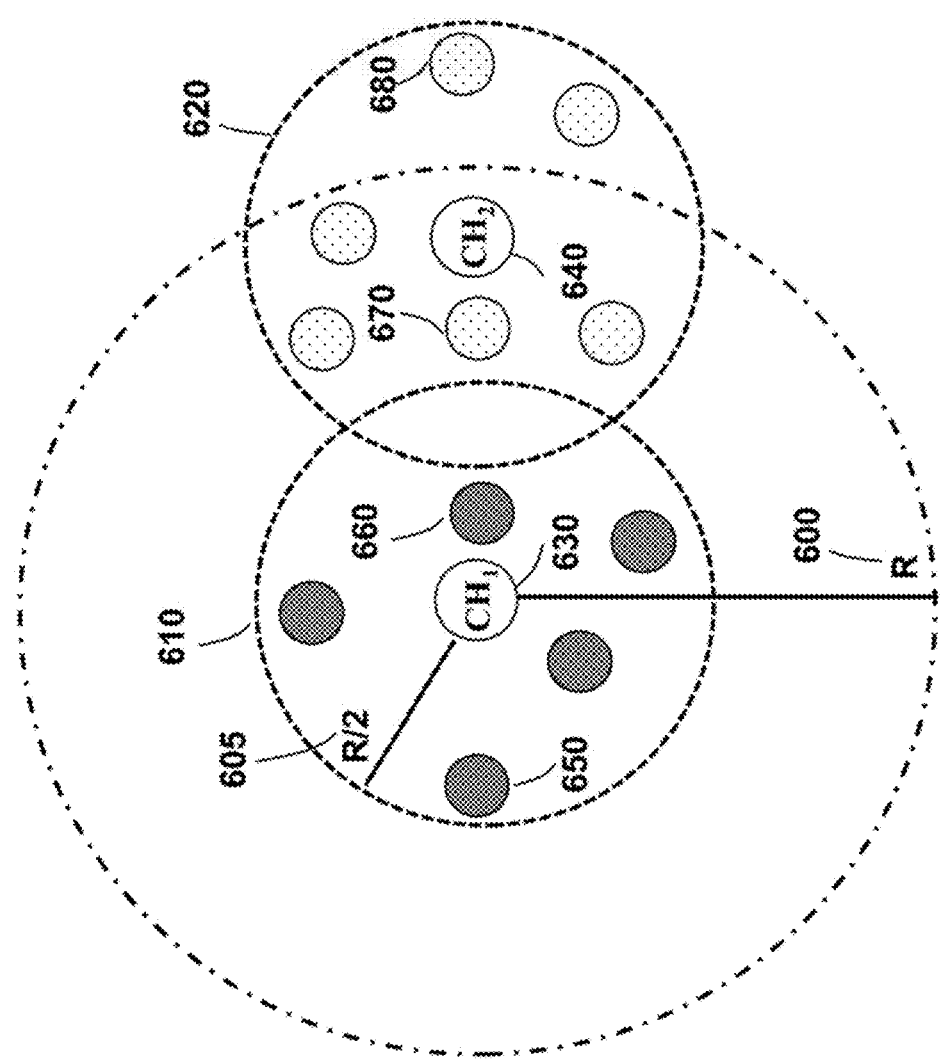
FIG. 6 is a schematic an example in which two neighboring clusters can interfere.

However, as shown in FIG. 6 collision between neighboring clusters is still possible without coordination. Consider two neighboring clusters $C_1$ 610 and $C_2$ 620 with cluster head $CH_1$ 630 and $CH_2$ 640, respectively. Each node has a transmission range R 600 and distance between a cluster member and its cluster head is less than or equal R/2 605. The distance between cluster heads $CH_1$ and $CH_2$ is less than R.

Transmission in cluster $C_1$ can be interfered by transmission in cluster $C_2$, and vice versa. Cluster $C_1$ has two members 650 and 660, and cluster $C_2$ has two members 670 and 680. Even though the distance between node 650 and node 670 is greater than R, transmission of node 670 interferes cluster head $CH_1$'s reception from node 650 because node 670 is hidden from node 650. Similar, transmission of node 660 interferes cluster head $CH_2$'s reception from node 680 because node 660 is hidden from node 680. Assume the size of cluster $C_1$ is $N_1$ and the size of cluster $C_2$ is $N_2$, and a transmission period is divided into T time slots. It can be shown that the probability of collision between nodes in two neighboring clusters $C_1$ and $C_2$ is $$PrC(C_1, C_2) = \frac{A}{A+B} \quad (5)$$

where $A =$ $N_1 * N_2 * T * (T-1) * (T-2) * \ldots * ((T-1) - (N_1 + N_2 - 2) + 1)$, and $B = T * (T-1) * (T-2) * \ldots * ((T-1) - (N_1 + N_2) + 1)$ As shown in FIGS. 7A, 7B and 7C, three types of packets are used for achieving coordination among clusters to eliminate interference among neighboring clusters, a data collection reservation (DCR) packet 710, a reservation acknowledgement (RA) packet 720, and reservation relinquish (RR) packet 730.

FIG. 7A shows the format of the DCR packet. The Type field indicates the type of the packet; RS_CH_ID field represents identifier of cluster head making reservation; SEQ is a reservation sequence number maintained by cluster head making reservation; RL field indicates length of time slot reserved; Options field is used for any other options. A reservation is uniquely identified by pair of (RS_CH_ID, SEQ).

FIG. 7B shows the format of the RA packet. The Type field shows the type of packet; ACJ_CH_ID represents identifier of cluster head acknowledging reservation; RS_CH_ID and SEQ fields are same as in DCR packet; Options field is used for any other options.

FIG. 7C shows the format of the RR packet. The Type field shows the type of packet; RS_CH_ID represents identifier of cluster head relinquishing reservation; SEQ has same value as in DCR packet; Options field is used for any other options.

Figure 8:
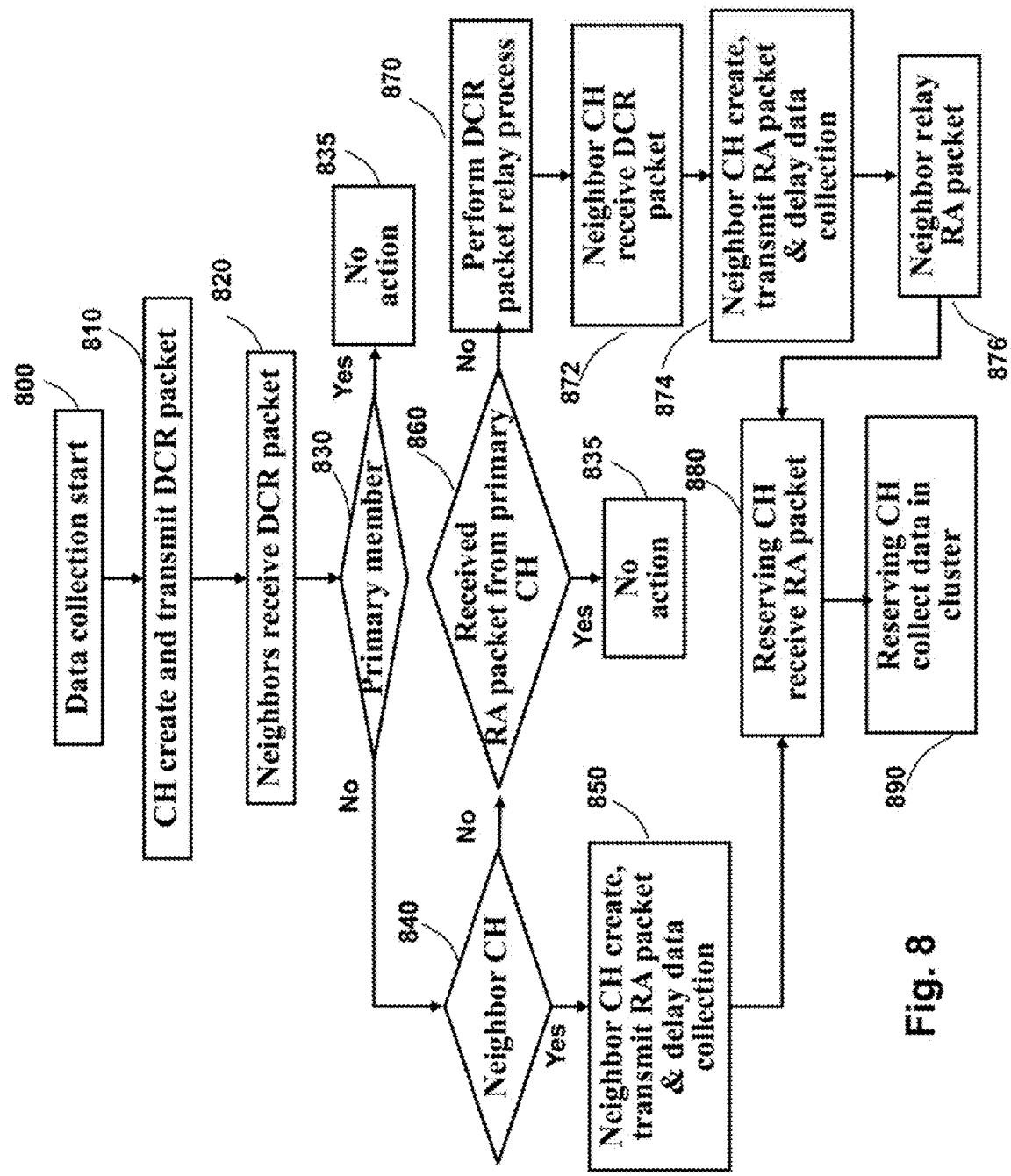
FIG. 8 is a block diagram of data collection coordination process among clusters according to embodiments of the invention.

FIG. 8 shows data collection coordination among neighboring clusters. To start data collection 800 within a cluster, the cluster head creates and transmits 810 the DCR packet to reserve a time slot for data collection. To create the DCR packet, the cluster head increments SEQ by 1 and sets RS_CH_ID to its ID, RL to an appropriate value, and Options to appropriate values. It then broadcasts DCR packet. All neighboring nodes of the reserving cluster head receive 820 the DCR packet. If the receiving neighbor is 830 a primary member of the reserving cluster, it does nothing 835 (no action).

If the receiving neighbor is not a primary member of the reserving cluster and is a cluster head 840 of another cluster, then this neighbor cluster head creates, transmits 850 the RA packet to the reserving cluster head to acknowledge the reservation and delays data collection in its cluster.

If the receiving neighbor is not a primary member of reserving cluster and is also not a cluster head of any other cluster, then it waits for RA packet from its primary cluster head. If the neighbor receives 860 the RA packet from its primary cluster head, then it takes no action 835. However, if neighbor does not receive the RA packet from its primary cluster head, it performs DCR packet relay process 870. The neighbor checks if the received DCR packet was relayed to its primary cluster head by any primary member in its primary cluster.

If yes, the neighbor performs no action. If not, the neighbor sends the DCR packet to its primary cluster head. After receiving 872 the DCR packet relayed by its primary cluster member, the neighboring cluster head 874 creates the RA packet, sends the RA packet back to the primary cluster member from which it received the DCR packet and delays data collection in its cluster.

After receiving the RA packet from its primary cluster head, the relaying neighbor then sends 876 the RA packet to the reserving cluster head. After receiving 880 the RA packets from all neighboring cluster heads, the reserving cluster head starts collecting 890 data in cluster. There is no interference from neighboring clusters because all neighboring cluster heads delay their data collection until to the end of the reserved time slot.

Within a cluster, data collection is managed by the cluster head. Data can be transmitted using TDMA or CSMA or other modulation schemes. The cluster head can or cannot aggregate collected data. Clusters heads in the M2M network use a routing method to route collected data to destination. Any feasible routing protocol can be used.

If the cluster head reserves more time than needed, it can relinquish reservation by broadcasting the RR packet. The transmitted RR packet propagates to neighboring cluster heads the same as the DCR packet. After receiving the RR packet, the neighboring cluster heads can start their data collection. Non-neighboring clusters can collect data simultaneously.

Figure 9:
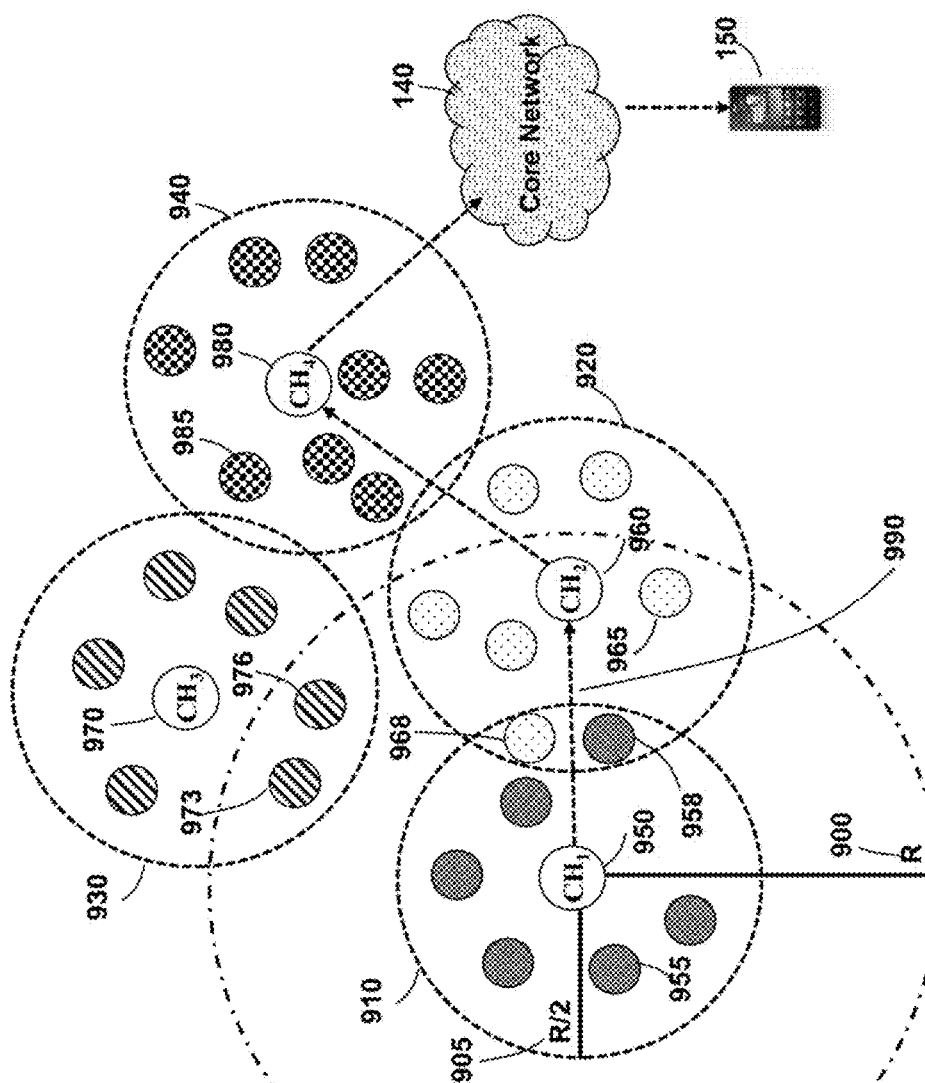
FIG. 9 is a block diagram of an example of data collection in a M2M network with four clusters according to embodiments of the invention.

FIG. 9 shows an example of the M2M network in which nodes are organized into clusters, data are collected coordinately among clusters and communicated to applications. Each node has a transmission range R 900, and the distance between cluster member and its cluster head is less than or equal to R/2 905. There are four clusters $C_1$ 910, $C_2$ 920, $C_3$ 930 and $C_4$ 940. Cluster heads are $CH_1$ 950, $CH_2$ 960, $CH_3$ 970 and $CH_4$ 980, respectively. When cluster head $CH_1$ broadcasts a DCR packet, all $C_1$'s neighboring nodes receive the DCR packet. Primary members of $C_1$ such as nodes 955 and 958 do not relay DCR packet. Neighboring cluster head $CH_2$ 960 and some of $C_2$'s primary members such as nodes 965 and 968 receive DCR packet.

After receiving DCR packet, neighboring cluster head $CH_2$ sends a RA packet back to cluster head $CH_1$ for acknowledgement. Cluster $C_2$'s primary members receive the RA packet transmitted by their primary cluster head $CH_2$, and therefore, do not relay the DCR packet. Neighboring cluster head $CH_3$ 970 cannot receive the DCR packet because it is outside of $CH_1$'s transmission range. However, two of cluster $C_3$'s primary members 973 and 976 receive the DCR packet. Because $C_3$'s primary members 973 and 976 do not overhear the RA packet from their primary cluster head $CH_3$, one and only one of members 973 and 976 perform DCR packet relay process and relay the RA packet transmitted by $CH_3$ to cluster head $CH_1$. After receiving DCR packet, neighboring cluster heads $CH_2$ and $CH_3$ delay their data collection.

After receiving the RA packets from all neighboring cluster heads, the reserving cluster head $CH_1$ starts data collection in cluster $C_1$. Cluster head $CH_4$ 980 and all $C_4$'s primary members such as member 985 do not receive DCR packet transmitted by cluster head $CH_1$. Therefore, clusters $C_4$ and cluster $C_1$ can concurrently collect data for their clusters. After data have been collected, cluster head $CH_1$ routes collected data along a route 990 to the core network 140, which then communicates data to the application 150. Also, node 958 selects $CH_1$ as its primary cluster head, and $CH_2$ as its back up cluster head. Similarly, node 968 selects $CH_2$ as its primary cluster head, and $CH_1$ as its secondary cluster head.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method clustering nodes in a network, comprising the steps of:

determining, in each node, a cluster head capability (CHC); broadcasting, directly or indirectly by each node, the CHC until all nodes have received the CHCs;

maintaining, in each node, a set (NB) that includes neighboring nodes j of the node i, wherein each entry in the set NB(i) has a format (ID, D, CHC), where ID represents an identifier of the neighboring node j, D represents a distance between the node i and the neighboring node j, and the CHC represents the cluster head capability of node j and wherein the CHC is CHCi=C(i)/Cmax*Ei*ERi, where C(i) is a capability classification of node i, Cmax is a maximal classification index, E(i) is a percentage of remaining energy of node i, and ER(i) is an expected reliability of node i when the node i is the cluster head;

nominating, in each node, one or more candidate cluster heads based on the CHCs; and selecting, in each node, at least one cluster head from the one or more candidate cluster head nodes, wherein the at least one cluster head has a maximal CHCs for the one or more candidate cluster head nodes.

2. The method of claim 1, wherein the nodes are heterogeneous.

3. The method of claim 1, wherein the distance D is $$D(i, j) = POW\left(\frac{P_0 - P_r}{10\alpha}\right) \quad (1)$$

where $P_0$ is the receiver power at 1 meter from the transmitting node j, $P_r$ is power measured at node i, and α is a path loss exponent of a channel between nodes i and node j.

4. The method of claim 1, further comprising:

broadcasting a cluster formation (CF) to initiate the clustering by a cluster manager node.

5. The method of claim 4, wherein the cluster manger is a gateway node.

6. The method of claim 5, wherein the cluster manager has a highest capability classification.

7. The method of claim 1, wherein a distance between any two cluster heads is greater than half a transmission range.

8. The method of claim 1, wherein the one or more cluster heads include one primary cluster head and one or more secondary cluster heads.

9. The method of claim 1, wherein the selecting is distributed over all nodes in the network.

10. The method of claim 1, wherein a distance between the node and the cluster head is less than half the transmission range.

11. The method of claim 10, wherein none of the cluster heads is within half the transmission range of the node, the node requests one of the candidate cluster heads to be the cluster head for that node.

12. The method of claim 1, wherein all nodes with the same cluster head can receive data form each other.

13. The method of claim 1, wherein the cluster head reserves a time slot to communicate with the nodes that selected the cluster head.

14. The method of claim 7, wherein any two nodes that at a distance greater than ~3R/2, wherein R is a transmission range, can communicate concurrently.

15. The method of claim 1, wherein a probability of selecting the cluster head is based on the capability classification.

16. The method of claim 1, wherein the classes in a high to low order are associated with a gateway, a smart meter data concentrator or factory machine controller, factory machines, smart meters, large scale sensors, and small scale sensors.

17. The method of claim 1, wherein a particular node rejects being the candidate cluster head.

* * * * *